UNITED STATES PATENT OFFICE.

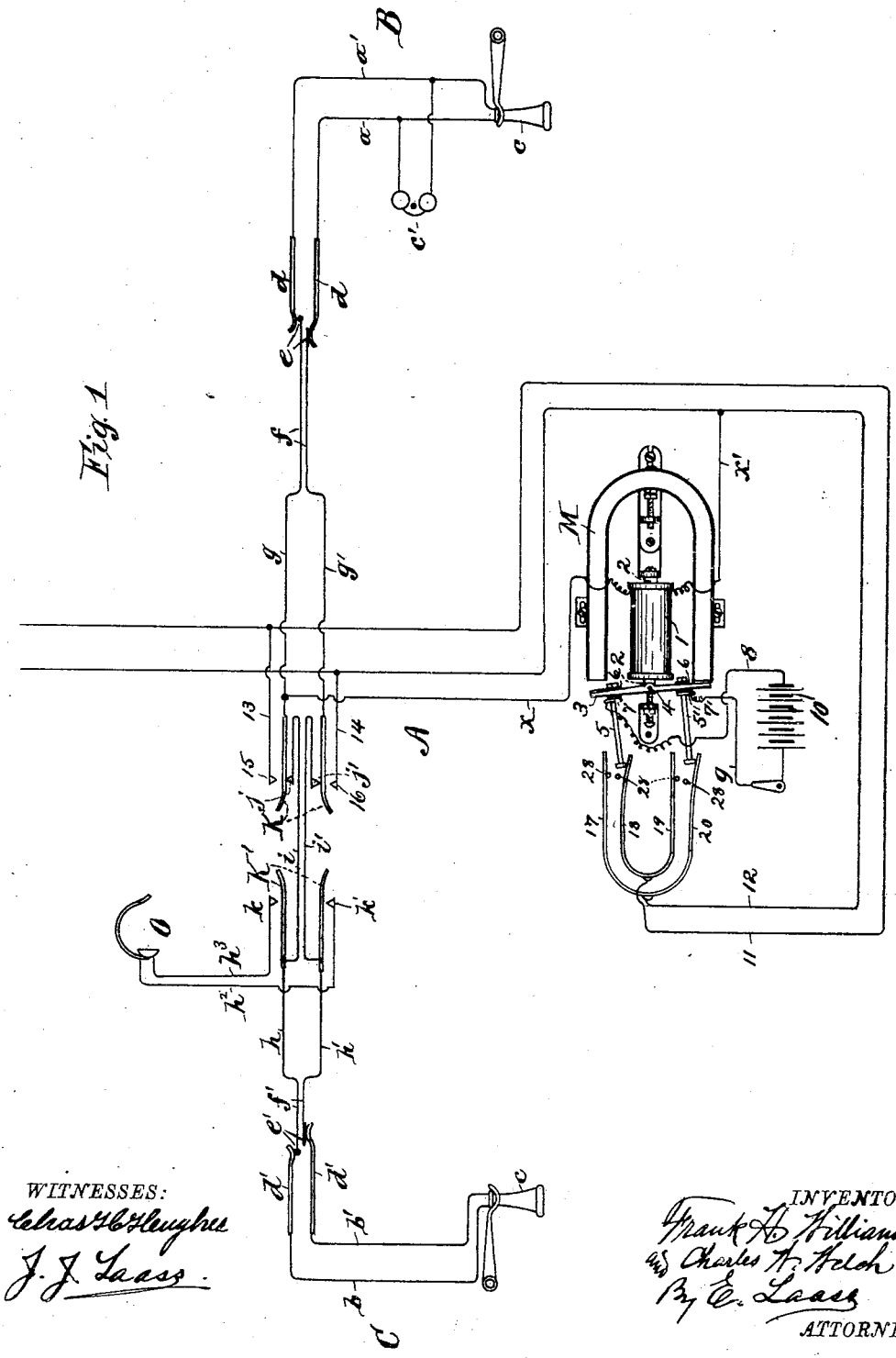

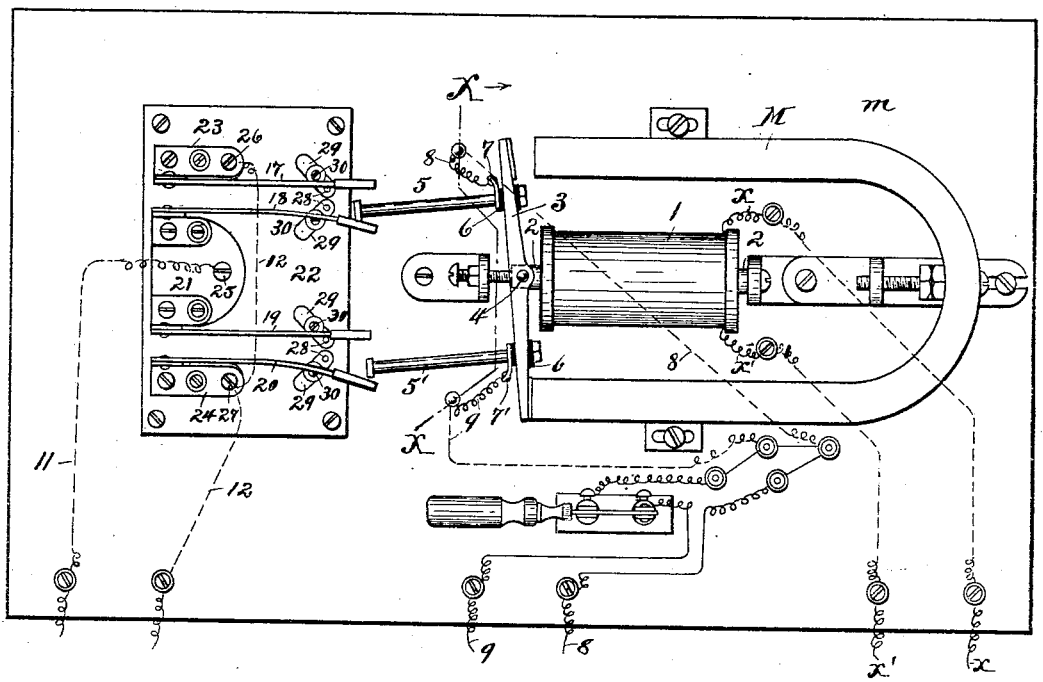

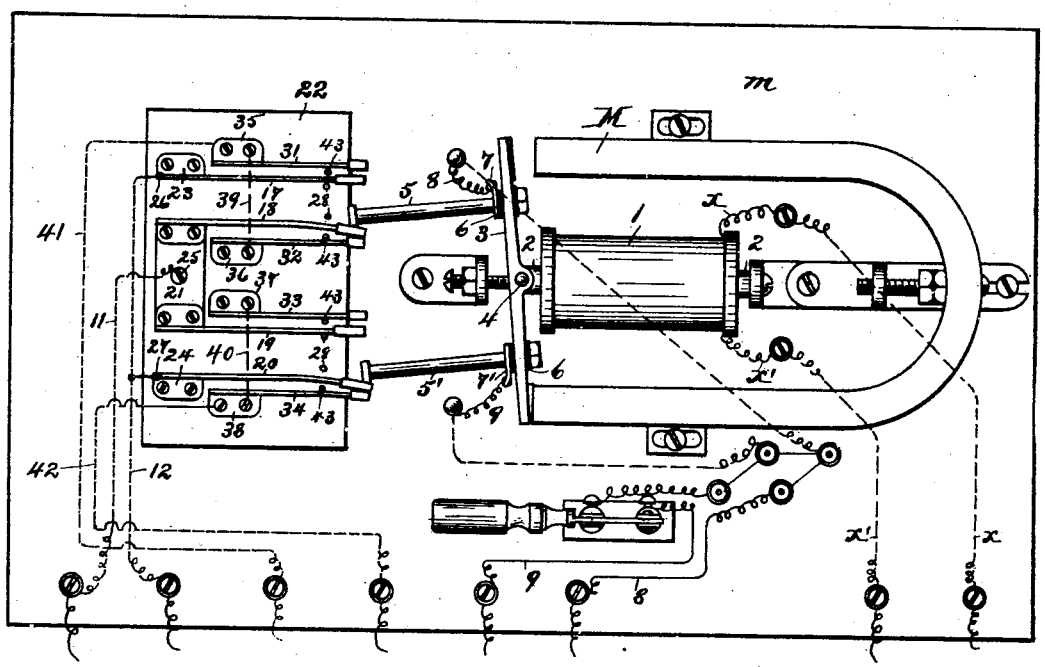

FRANK H. WILLIAMS AND CHARLES W. WELCH, OF GREENE, NEW YORK.

AUTOMATIC POLE-CHANGER.

No. 931,242.　　Specification of Letters Patent.　　Patented Aug. 17, 1909.

Application filed March 8, 1907. Serial No. 361,397.

*To all whom it may concern:*

Be it known that we, FRANK H. WILLIAMS and CHARLES W. WELCH, citizens of the United States, and residents of Greene, in the county of Chenango, in the State of New York, have invented new and useful Improvements in Automatic Pole-Changers, of which the following, taken in connection with the accompanying drawings, is a full, clear, and exact description.

This invention pertains to signaling-apparatus connected to the switch-board of a telephone-exchange and controlled by the operator's key for the purpose of ringing the magneto-bells at sub-stations to call subscribers.

The invention relates to pole-changers included in the signaling or ringing-circuit and comprising magnetically controlled electric circuit-makers and breakers which are designed to alternately engage a plurality of electric-contacts in the circuit for the purpose of reversing the direction of the current from the battery or other source through the circuit, such changes in the circuit being produced by the changes in polarity in the magnet elements.

The object of the present invention is to provide a very efficient and reliable pole-changing apparatus for the signaling or ringing-circuit of a telephone-system which shall eliminate the use of numerous primary batteries provided to operate the vibrators of pole-changers commonly employed for effecting the ringing of the magneto-bells at sub-stations, thus materially simplifying the system and reducing the expense of maintenance.

Other objects of the invention will be apparent by the novel arrangement and construction of the component parts of our pole-changing apparatus as combined with the signaling or ringing-circuit of a telephone-system, and hereinafter fully described.

In the accompanying drawings Figure 1 is a diagrammatic view of a telephone-system showing conventionally arranged lines, connections and instruments sufficient to represent a main station or exchange and two sub-stations, and illustrating our pole-changing apparatus forming part of the signaling or ringing-circuit at the main station: Fig. 2 is an enlarged detail front view of the pole-changer; Fig. 3 is a vertical section taken on the line —X—X— in Fig. 2; Fig. 4 is a fragmentary plan view showing the insulating block which supports the two pairs of flexible contact-plates included in the signaling-circuit and designed to be alternately engaged by the circuit-making and breaking rods for changing the direction of the current from the battery through the circuit; Fig. 5 is a further enlarged fragmentary view showing the insulated connection of the circuit-making and breaking rods to the pivoted armature, and Fig. 6 shows our pole-changer having a pulsating-ringer combined therewith.

Similar letters and numerals of reference indicate corresponding parts in the various views in the drawings.

—A— designates the main station or central office of the telephone-system, and —B— and —C— designate two sub-stations.

—$a$—$a^1$— represent the two wires of the line extending from the usual switch-board (not shown) at the main station to sub-station —B—, and —$b$—$b^1$— represent the wires of the line to sub-station —C—. At each of the sub-stations is shown the well known telephone-receiver —$o$—, while we have indicated the usual magneto-bells —$c^1$— at sub-station —B— only. These two pairs of wires —$a$—$a^1$— and —$b$—$b^1$— terminate at the switch-board of the main station in the usual spring-jacks —$d$—$d$— —$d^1$—$d^1$— respectively, said spring-jacks being designed to receive the plugs —$e$—$e^1$— attached to the usual cords indicated at —$f$—$f^1$—, whereby the operator may effect a connection between either line and switch-board for answering a call from a sub-station and signaling a sub-station in the usual and well known manner.

The circuit at the switch-board may be of any arrangement and construction, an essential part of said circuit being represented in the present instance by the two pairs of wires —$g$—$g^1$— and —$h$—$h^1$— to which the cords —$f$—$f^1$— are attached, and also wires —$i$—$i^1$—. The wires —$i$—$i^1$— are permanently connected at one end to the wires —$h$—$h^1$—, and at their other ends they are provided with contact-point —$j$—$j^1$— normally in contact with the ringing-key indicated at —K—, said key being permanently connected to the wires —$g$—$g^1$—.

—$K^1$— denotes the usual listening-key for the operator and which is disposed at the switch-board. This key is shown connected to the wires —$h$—$h^1$— and is designed to engage contact-points —$k$—$k^1$— to which are connected the cords —$h^2$—$h^3$— of the operator's instruments indicated at —O—.

—11— and —12— denote the wires of the signaling or ringing-circuit, which wires are connected to wires —13— and —14— provided with contact-points —15—16— disposed adjacent to and normally out of contact with the ringing-key —K—.

Inasmuch as the lines, connections and all other parts hereinbefore described are common and well known in telephone-systems, further description and illustration are unnecessary. Therefore, we will now proceed to describe the construction and operation of our pole-changing apparatus as combined with a telephone-system.

—M— denotes a permanent polarized U-magnet which, in this instance, is supported on a panel —$m$— which may be fastened to the switch-board at the main station of the system, or supported in any convenient place adjacent thereto, or the said magnet may be attached directly to the switch-board. Between the poles of this permanent magnet —M— is disposed a coil —1— wound to a high resistance upon a long soft-iron core —2— which is rigidly connected to or mounted at one end on the magnet at the neutral point thereof. This coil is included in a branch or auxiliary circuit comprising the wires —$x$—$x^1$— connected respectively to the wires —12 and —$g$—. The opposite or forward end of the core —2— projects from the coil and upon this end is pivotally mounted an armature —3—. This armature is pivoted at the center of its length, as indicated at —4—, so as to permit its end portions to be alternately attracted by the respective poles of the permanent magnet —M— for the purpose shortly explained.

—5—$5^1$— denote a pair of parallel circuit-making and breaking rods which are rigidly secured at one end to the armature —3— at opposite sides of its pivot. Said rods extend forwardly from the armature and are insulated therefrom as indicated at —6— and more clearly illustrated in Fig. 5 of the drawings. These rods are provided respectively with electric-terminals —7—$7^1$— to which are connected the wires —8—9— from the battery —10— of the signaling or ringing-circuit, and thus said rods are included in the circuit.

The signaling-circuit wires —11—12— extend to the switch-board (not shown) and are connected thereat to the wires —13—14— as stated, and the other ends of the said signaling-wires are connected to two pairs of yielding contacts —17—18—19—20. These contacts consist preferably of flexible metallic plates, the plates 17—19 constituting one pair, and plates 18—20 constituting the other pair. The wire —11— is connected to the contact-plates —18—19—, and the wire —12— is connected to the contact-plates —17—20—.

The free end of the circuit-making and breaking rod —5— is disposed to vibrate between the contact-plates —17—18, and the corresponding end of the other circuit-making and breaking rod —$5^1$— is disposed to vibrate between the contact-plates 19—20— to change the direction of the current through the signaling-circuit, as will be more fully described.

We prefer to fasten the contact-plates —18—19 to a metallic plate —21— which is screwed or otherwise rigidly secured to an insulating block —22— mounted on the panel —$m$— or on the switch-board, and fasten the contact-plates —17—20— to separate metallic plates —23—24— also secured to the block —22—. The plate —21— is provided with a suitable binding-post —25— to which the wire —11— of the signaling or ringing-circuit is fastened, and the plates 23—24— are provided with binding-posts —26—27— respectively for the connection of the other wire —12— of the circuit.

—28—28 denote pins projecting from the insulating block —22— and arranged in pairs between the free end portions of the contact-plates —17—18— and —19—20—. These pins serve as stops limiting the movements of the plates when they are relieved from pressure of the circuit-making and breaking rods —5—$5^1$— so as to prevent arcing of the current between the plates and resultant burning of the same. The said contact-plates are preferably composed of thin strips of brass and are provided on their free ends with copper tips against which bear heads formed on the contact ends of the rods —5—$5^1$—. We prefer to mount the stop pins —28—28— on plates —29—29— which are preferably secured to the block —22— by means of screws —30—30— or by any other fastening device which will permit the plates to be turned for the purpose of adjusting the pins in relation to the contact-plates.

Having described the construction and arrangement of the component parts of our pole-changing apparatus as associated with a telephone-exchange system, we will now proceed to explain the operation, which is as follows, to wit: Assuming that a party at station —C— desired to talk with a party at station —B—, it is obvious that the operation at the main station —A— will be called when the receiver —$o$— at station —C— is removed from the usual hook. Upon receiving the call, the operator actuates the so-called listening-key —$K^1$—, as usual, to throw the instruments at —O— into circuit with the line-wires —$b$—$b^1$— extending to the calling station. The operator then actuates the key —K— whereby the line-wires —$b$—$b^1$— are cut out at the contacts —$j$—

$j^1$— on the switch-board. The operation of the key —K— effects a connection between the contacts —15—16—, thereby closing the signaling or ringing-circuit which includes the wires —11—, —12—, —$x$—, and —$x^1$—, and also the battery —10— and pole-changing apparatus hereinbefore described. It is understood, of course, that the operator inserts the usual plug —$e$— into the spring-jacks —$d$—$d^1$— or other devices on the switch-board previous to closing the contact-points —15—16—, in order to connect the wires —$a$—$a^1$— extending to station —B— with the signaling or ringing-circuit. It is evident, that by closing the contact points —15—16—, the current from the battery is caused to flow through the circuit. It is obvious that the armature —3— will rest indifferently in relation to the poles of the permanent magnet —M— while the circuit is broken. Therefore, assuming that the said armature is resting in contact with the negative pole of the magnet and the circuit is closed by the key —K— as aforesaid, it is evident that the current from battery —10— will flow through wire —8—, rod —5—, contact-plate —18— and wire —11— to switch-board and consequently through the wires —$a$—$a^1$— to station —B—, and return from switch-board to the battery through wire —12—, contact-plate —20—, rod —$5^1$— and wire —9—. By thus completing the circuit, it is obvious that the current will pass through the high-resistance coil —$l$— owing to its connection to the circuit by the wires —$x$—$x^1$— as stated and shown in Fig. 1.

The armature —3— being in contact with the negative pole of the permanent magnet —M— upon completing the signaling or ringing-circuit, as described, it is now evident that the core —2— of the coil will possess a corresponding polarity, owing to the passage of the current through said coil, whereby the armature is attracted by the positive pole of the magnet. This movement of the armature moves the rods —5—$5^1$— out of engagement with the yielding contact-plates —18—20— and thereby breaking the battery-current, and then moves the rods into contact with the contact-plates —17—19— to again close the circuit. The closing of the circuit through the rods —5—$5^1$— and plates —17—19— causes the battery-current to flow in reverse direction. It will be evident that, when the armature moves into contact with the positive pole of the permanent magnet —M—, the current in passing through the coil —1—, will produce a polarity in the core which corresponds to the said magnet-pole, and thus the armature is attracted by the negative magnet-pole and obviously repelled by the other pole, whereby the direction of the current is again changed. This rapid and alternate making and breaking of the signaling or ringing-circuit through the contact-plates —17—19— and —18—20— by the rods —5—$5^1$— actuated by the vibrating armature, and resultant alternating impulses produced in the signaling-circuit and line-wires —$a$—$a^1$— will obviously effect the ringing of the magneto-bells at station —B—. When the operator has succeeded in calling station —B—, the key —K— is actuated to cut out the signaling-circuit at the contact-points —15—16—, whereby a connection is made at contact-points —$j$—$j^1$— between the lines —$a$—$a^1$— and —$b$—$b^1$— extending to the two stations —B— and —C—. It will be understood that the aforesaid coil —1— may be connected to the signaling or ringing-circuit either in series or multiple.

We do not limit ourselves to the association of the pole-changing apparatus with a telephone-system constructed and arranged as shown in the accompanying drawings. Neither do we wish to be limited to the specific construction and arrangement of the component parts of the pole-changing apparatus, inasmuch as the same is subject to various modifications without departing from the spirit of the invention.

By referring to Fig. 6 of the drawings it will be observed that our described pole-changing apparatus may be modified by providing four additional yielding contact-plates —31—32—33—34—, which are disposed adjacent to the respective contact-plates —17—18—19—20 to be engaged thereby, by which arrangement an alternating current may be transmitted from the latter contact-plates, or a pulsating current may be transmitted from the contact-plates —31—32—33—34—, thus adapting the apparatus for two-party ringing as will be hereinafter more fully explained, the main object of this modification of the apparatus being to dispense with the use of a separate pulsating ringing-apparatus as now used in telephone systems for the purpose stated. The additional contact-plates —31—32—33—34— are arranged in pairs and are disposed adjacent to and parallel with the aforesaid contact-plates —17—18—19—20—, and they are preferably fastened to plates —35—36—37—38— respectively mounted on the insulating block —22—. The pair of contact-plates —31—32— are placed at opposite sides of the respective contact-plates —17—18— and are adapted to be engaged thereby when the latter are actuated by the rod —5— incident to the vibrations of the armature —3— before the poles of the permanent magnet —M—. The supporting-plates of the contact-plates are preferably connected by a short wire —39—, however this electrical connection between the two contact-plates may be effected by providing a single supporting-plate. The other pair of additional contact-plates —33—34— are arranged at opposite sides of the respective contact-plates —19—20— to be engaged thereby when the latter are actuated by the rod —5¹—. These plates —33—34— are connected by a wire —40—. From the respective pairs of contact-plates —31—32— and —33—34— extend two wires —41—42— which lead to the switch-board and are designed to be thrown, by means of a regular master-key, into and out of connection with a party-line equipped with bells which are responsive to a pulsating current. The connections of the wires —41—42— to the switch-board are the same as those of the wires —11—12—, and the circuit is to be closed and opened by a key which may be like the key —K—, and connection is made with a two-party line by means of the usual plug. Inasmuch as these connections and the key are shown in Fig. 1, further illustration and description are unnecessary. When the ringing-circuit is closed in the manner hereinbefore described, the circuit-making and breaking rod —5— is actuated by the vibrating armature —3— and serves to alternately move the contact-plates —17—18— into engagement with the respective contact-plates —31—32— and simultaneously therewith, the circuit-making and breaking rod —5¹— is caused to alternately move the contact-plates —19—20— into engagement with the respective contact-plates —33—34—. When the armature —3— is attracted by one of the poles of the permanent magnet —M— as shown in Fig. 6 of the drawings, it is evident that a positive current will flow from the batteries —10— through the rod —5—, and then through the contact-plates —13—32— and out through the wire —41—, and thence return through wire —42—, contact-plates —34—20— and rod —5¹—. When the armature is attracted by the other magnet-pole, due to the corresponding polarity produced in the core —2— of the coil —1— as aforesaid, the rod —5—, by engaging the contact-plate —17—, will press the latter against the contact-plate —31— and at the same time the rod —5¹— will press the contact-plate —19— against the contact-plate —33—. In this instance the positive current will obviously pass through the rod —5—, contact-plates —17—31— and wire —41—, and return through the wire —42—, contact-plates —33—19— and rod —5¹—. By the described arrangement of parts, it is evident that the short make and break in the signaling or ringing-circuit between the two sets of contact-plates will produce rapid pulsations in the current through the wires —41—43—, and thus effect a ringing of bells on a line through which the pulsations are sent. The contact-plates —31—32—33—34— are each provided with a stop-pin —43— for limiting the return movement when they are relieved from pressure of the other contact-plates. It is evident that the pulsating current sent out through the contact-plates —31—32— will always have the same polarity.

Having described our invention, what we claim is:—

1. In a pole-changing apparatus for the signaling-circuit of a telephone-system, the combination of a permanent polarized U-magnet, a high-resistance coil disposed between the poles of said magnet and having a core connected at one end to the magnet at the neutral point of the latter, an armature pivoted intermediate its ends to the opposite end of the core and having the ends disposed so as to be alternately attracted by the magnet-poles, two pairs of insulated electric-contacts having suitable circuit-connections, all of said contacts being in alinement and one set positioned between the contacts of the other set, an adjusting block positioned adjacent each contact and a stop-pin mounted on each block normally engaging a contact and limiting the movement thereof in one direction, a pair of insulated circuit-makers and breakers fastened to the armature at opposite sides of its pivot and provided with electric-terminals for connecting the same with a source of current, said circuit-makers and breakers being each adapted to alternately engage one member of each pair of contacts, and circuit-connections for the aforesaid coil whereby the current is sent through the latter and produces in its core a polarity corresponding to the magnet-pole to which the armature has been attracted so as to cause the armature to be attracted to the other magnet-pole, the vibrations of the armature thus effected causing the circuit-makers and breakers to rapidly reverse the direction of the current through the two pairs of contacts for the purpose set forth.

2. In a pole-changing apparatus for electric-signaling, the combination of a permanent polarized magnet, a battery, a high-resistance coil disposed between the poles of the magnet and having a core connected at one end to the said magnet at the neutral point thereof, an armature pivotally supported on the opposite end of the core and adapted to be attracted alternately by the two poles of the magnet, two pairs of yielding electric-contacts insulated apart, all of said contacts being in alinement and one set positioned between the contacts of the other set, an adjusting block positioned adjacent each contact and a stop-pin mounted on each block normally engaging a contact and limiting the movement thereof in one direction, conductors leading from the respective pairs of contacts, a pair of insulated circuit-making and breaking rods mounted at one end on the armature at opposite sides of its pivot and connected to the respective terminals of the battery, the free ends of said rods being each disposed to alternately engage one member of each of the two pairs of contacts, auxiliary conductors connecting the coil to the aforesaid conductors, whereby the current in passing through the said coil produces in its core a polarity corresponding to the magnet-pole to which the armature has been attracted so as to cause the armature to be attracted by the other magnet-pole, the vibrations of the armature thus effected and resultant alternate engagements of the rods with the said contacts causing the battery-current to be rapidly reversed through the said contacts for the purpose set forth.

3. The combination of an electric-circuit comprising two lines and including a battery, two sets of contacts connected to the respective lines, all of said contacts being in alinement and one set positioned between the contacts of the other set, an adjusting block positioned adjacent each contact and a stop-pin mounted on each block normally engaging a contact and limiting the movement thereof in one direction, a permanent polarized U-magnet, an auxiliary circuit including a high-resistance coil disposed between the poles of the magnet and having a core connected at one end to the magnet at the neutral point of the latter, an armature pivotally mounted on the opposite end of the core, said armature being adapted to be attracted alternately by the poles of the magnet incident to the passage of the electric-current through the coil and resultant production of a polarity in the core corresponding to the magnet-pole to which the armature has been attracted, a pair of insulated rods secured to the armature at opposite sides of its pivot and connected respectively to the two terminals of the battery and coöperating with the two sets of contacts, whereby an alternating current is transmitted through one line and a pulsating current is transmitted through the other line as and for the purpose set forth.

FRANK H. WILLIAMS.
CHARLES W. WELCH.

Witnesses:
GEORGE L. PAGE,
WILLIAM E. HALL.